Jan 6, 1931. R. L. MULLER 1,787,489
CARRIAGE EQUIPMENT FOR ACCOUNTING MACHINES
Filed July 30, 1927    6 Sheets-Sheet 5
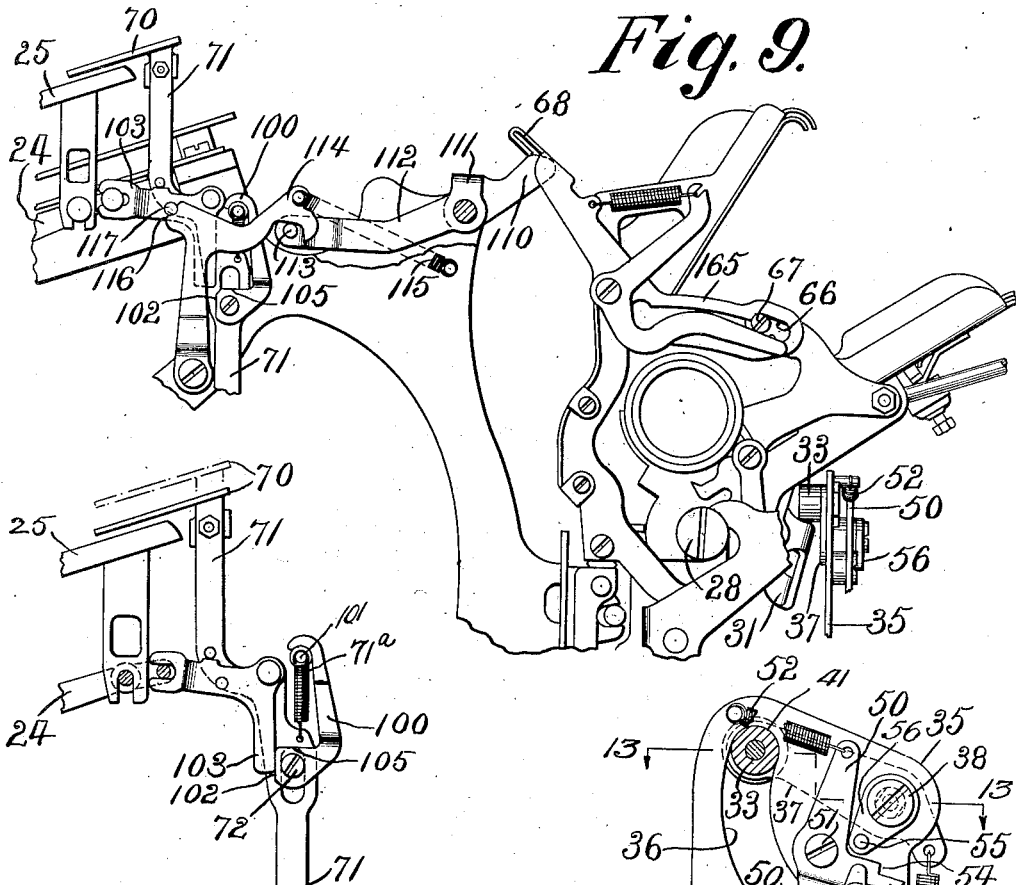
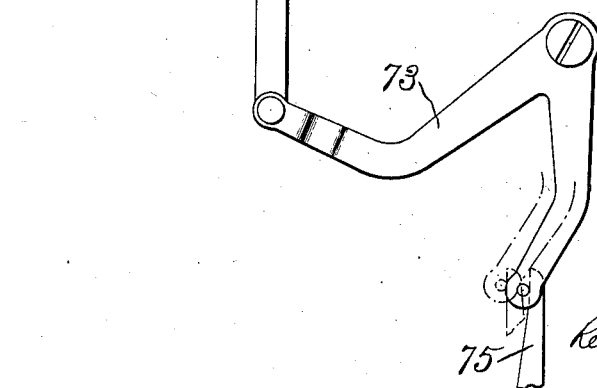
INVENTOR
Robert L. Muller
BY
Rector, Hibben, Davis, & Macauley
ATTORNEYS

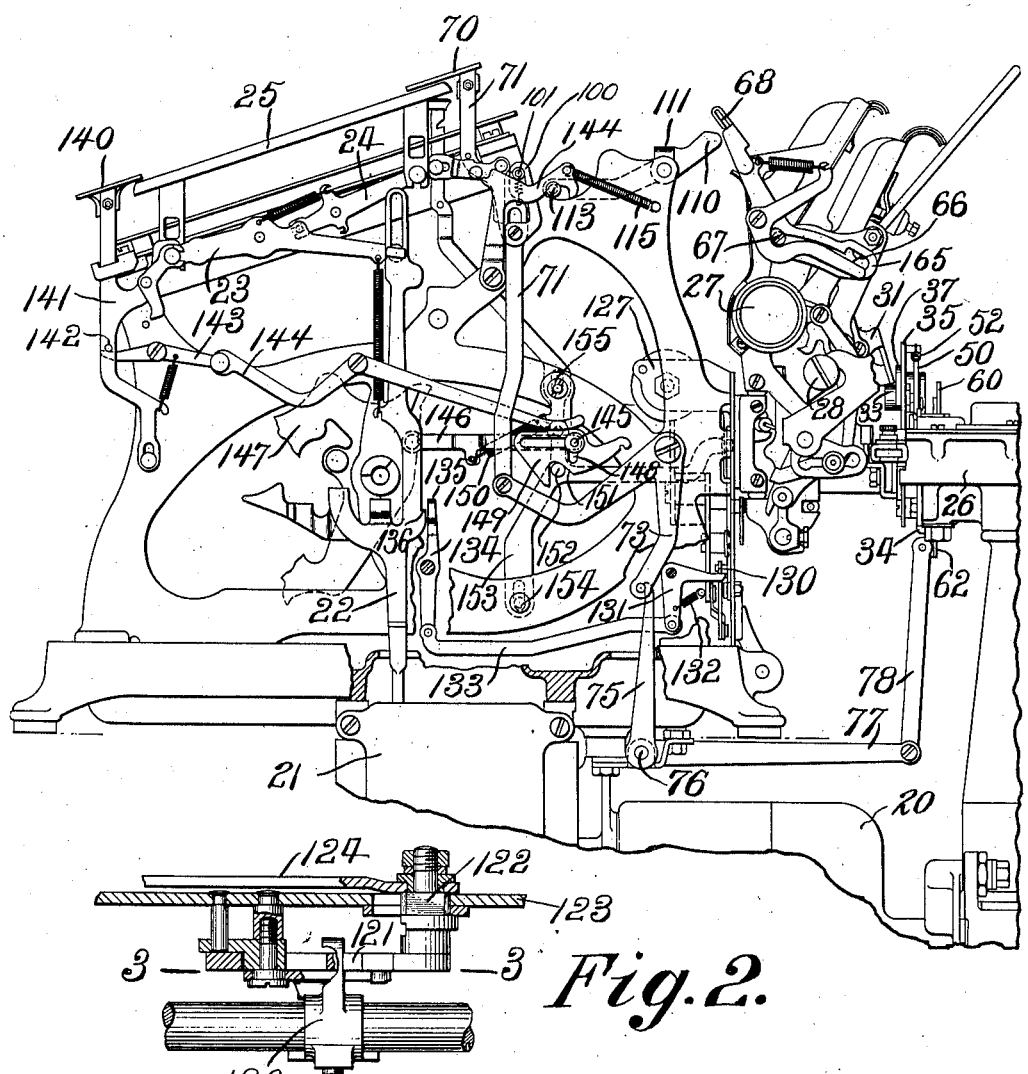
Fig.1.
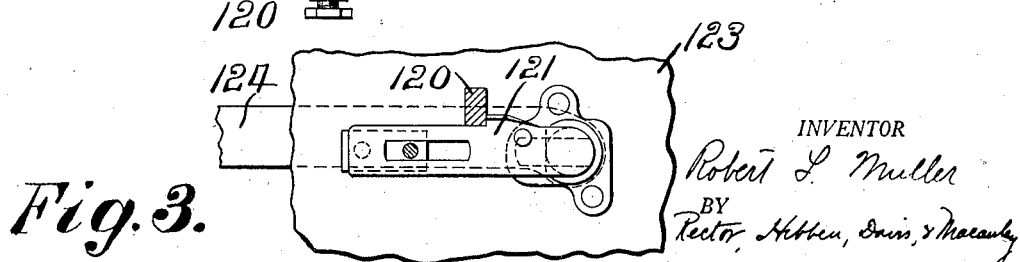
Fig.2.
Fig.3.
INVENTOR
Robert L. Muller
BY
Rector, Hibben, Davis & Macauley
ATTORNEYS

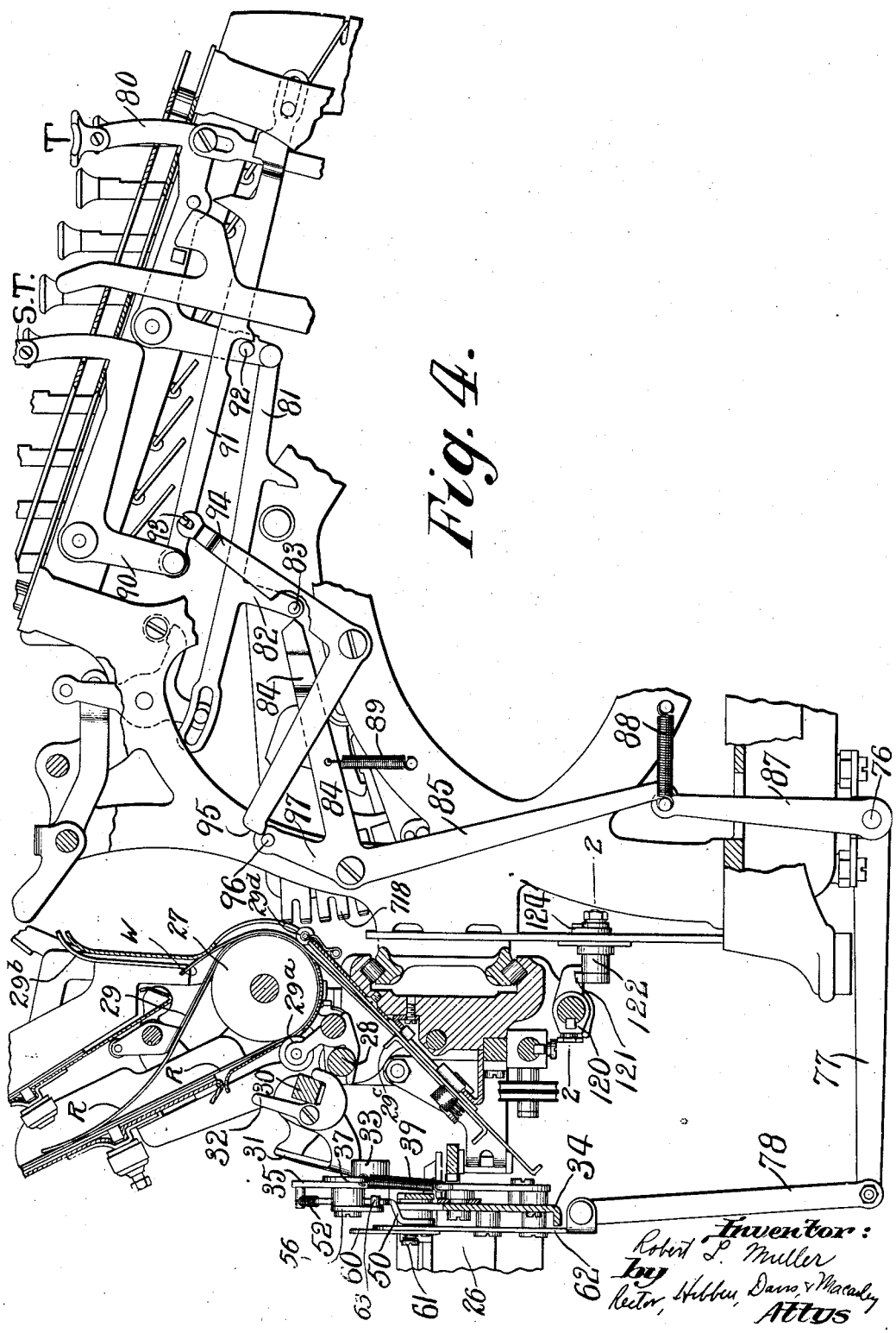

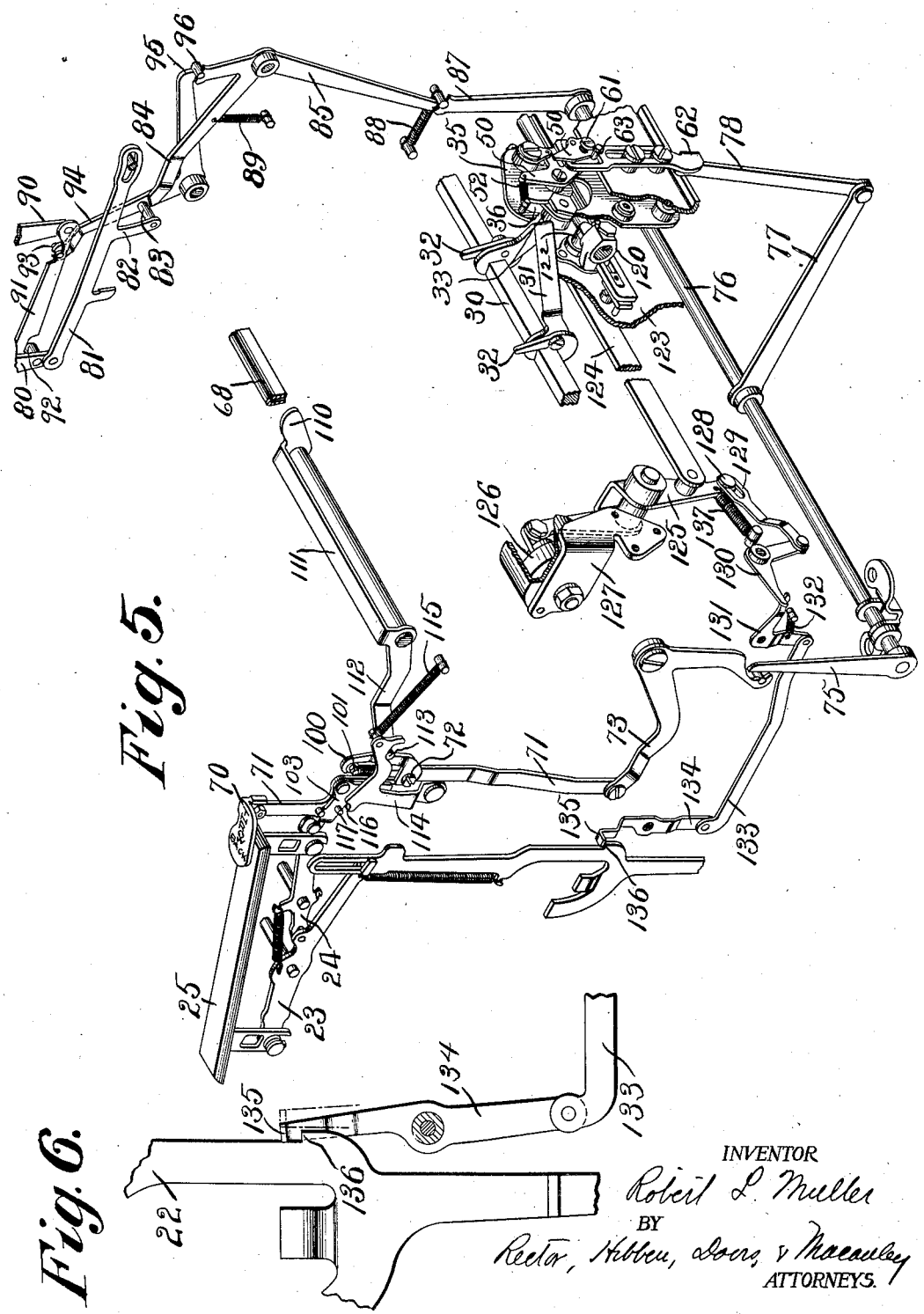

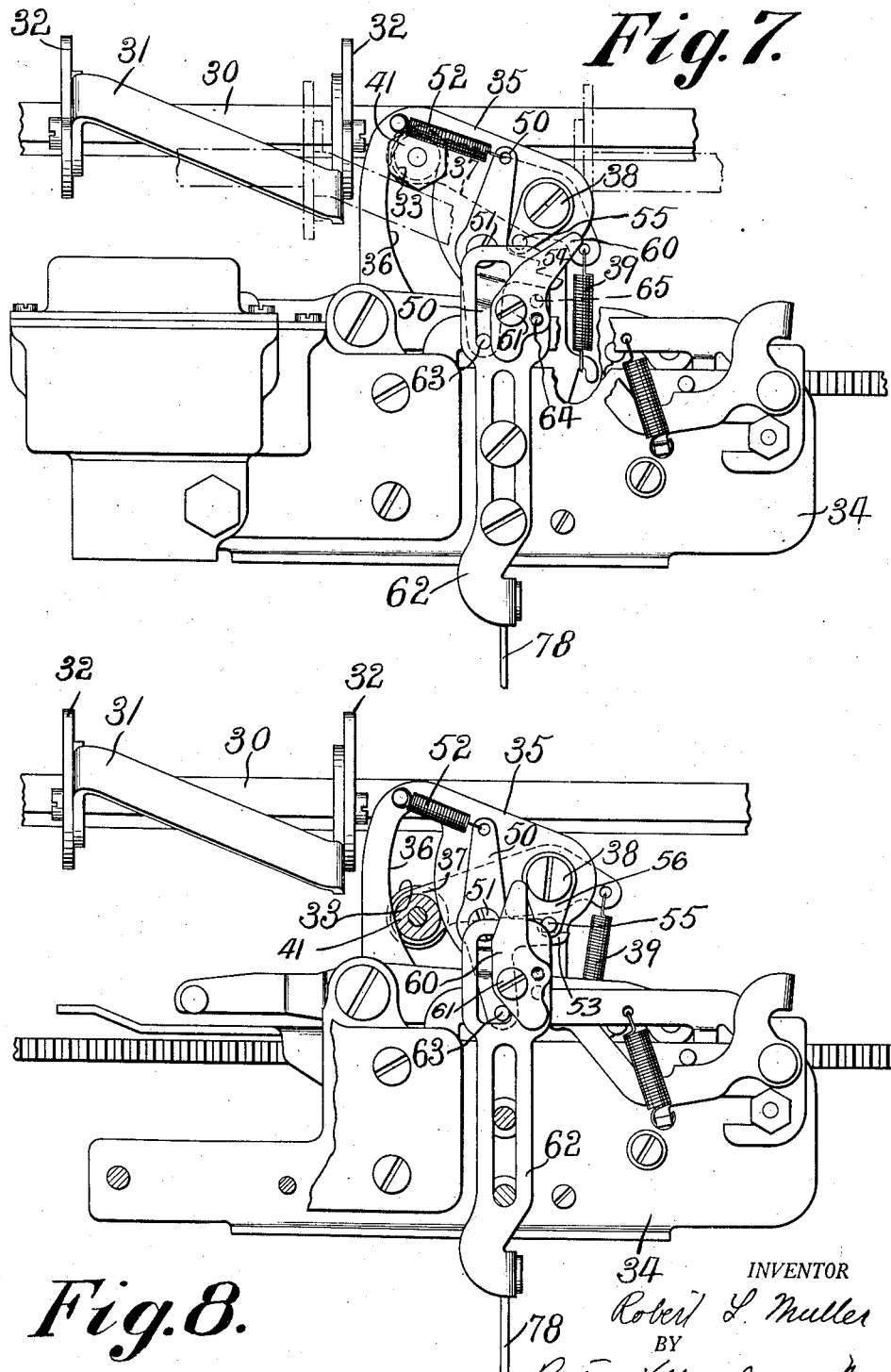

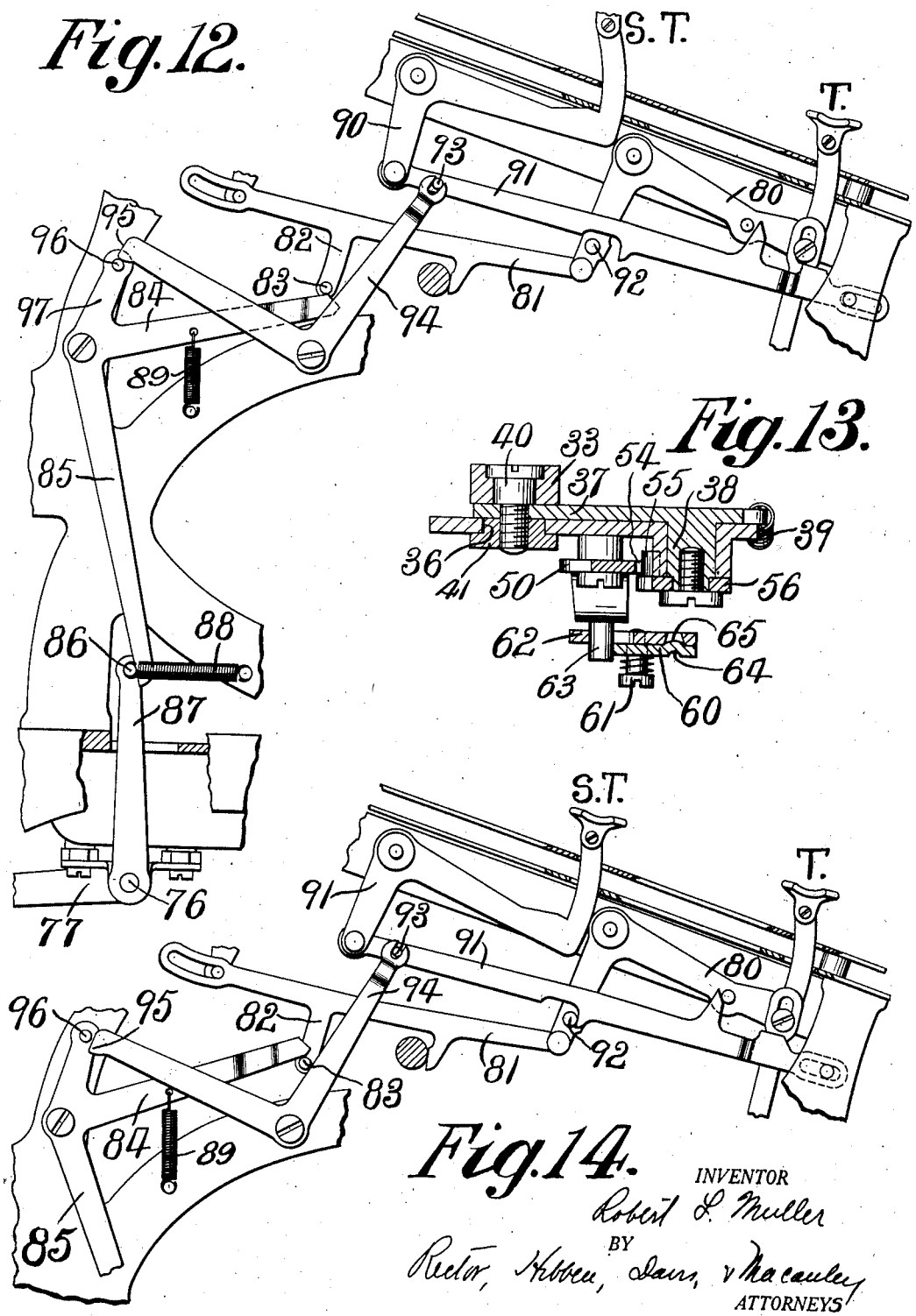

Patented Jan. 6, 1931

1,787,489

UNITED STATES PATENT OFFICE

ROBERT L. MULLER, OF DETROIT, MICHIGAN, ASSIGNOR TO BURROUGHS ADDING MACHINE COMPANY, OF DETROIT, MICHIGAN, A CORPORATION OF MICHIGAN

CARRIAGE EQUIPMENT FOR ACCOUNTING MACHINES

Application filed July 30, 1927. Serial No. 209,454.

This invention relates to carriage equipment for accounting machines.

A paper carriage for accounting machines has been developed, shown in Trew Patent No. 1,723,668, August 6, 1929, in which a portion of the paper carriage supporting the platen is automatically tilted from one position to another relative to the printing mechanism. The present invention relates to carriage equipment of this type and it is concerned principally with improvements which enable the automatic tilting feature to be placed under the ready control of the operator so that one, two, three, or more lines of entries may be made before the platen is moved. It also concerns the control of the automatic tilting feature through the total and other control keys.

The general object of the invention is to provide an improved carriage equipment for accounting machines in which a portion of the carriage is tilted from one position to another in certain columnar positions of the carriage and such automatic operations placed under the ready control of the operator.

Other objects of the invention are to provide an automatic control of the tilting feature of the carriage through the total key and the provision of certain interlocking devices for insuring that the carriage control keys will be operated in the proper manner.

Other objects and advantages of the invention will appear from the specification and drawings.

An embodiment of the invention is shown in the accompanying drawings, in which

Figure 1 is a skeletonized right-side elevation of an accounting machine showing the parts concerned with the present invention;

Fig. 2 is a sectional view on the line 2—2 of Fig. 4, illustrating the details of some of the carriage connections on the rear of the machine;

Fig. 3 is a fragmentary side elevation taken on the line 3—3 of Fig. 2;

Fig. 4 is a fragmentary left-side elevation of an accounting machine with the invention applied thereto;

Fig. 5 is a skeleton perspective view of the controls for the carriage;

Fig. 6 is a detailed view showing one of the locking connections for the starting bar;

Fig. 7 is a fragmentary rear elevation of the control mechanism for tilting the carriage showing the parts in the position they occupy when the control mechanism is positioned to tilt the carriage portion in the next tabulating operation of said carriage;

Fig. 8 is a view similar to Fig. 7, showing the parts out of operating position;

Fig. 9 is a fragmentary right-side elevation showing the carriage portion tilted rearwardly and the motor bar and throw-back keys locked against depression;

Fig. 10 is a fragmentary view showing in greater detail the motor-bar and throw-back key interlocking mechanism;

Fig. 11 is a view similar to Figs. 7 and 8 showing the control of the throw-back mechanism by means of a special key for that purpose and by the total key;

Fig. 12 is an enlarged fragmentary side view showing the total key connection for operating the throw-back mechanism;

Fig. 13 is an irregular section taken on the line 13—13 of Fig. 11;

Fig. 14 is a view similar to Fig. 12 illustrating particularly the connections operated by the sub-total key as related to the throw-back mechanism.

The invention is shown applied to an accounting machine of the Burroughs type which is driven by a motor 20 (Fig. 1) that is controlled by a switch 21 operated by a vertically movable bar 22 connected to the pivoted levers 23 and 24 which are operated by the starting or touch bar 25 on the machine keyboard. Mounted on the rear of the machine is a traveling paper carriage which may be tabulated laterally across the machine from right to left as viewed from the front and automatically returned through connections operated by the motor 20 and contained within the housing 26. This carriage, the tabulating and the returning mechanism therefor are described in detail in Rinsche Patent 1,580,534 to which reference is made. The paper carriage supports a platen 27 and the upper portion or frame of the carriage which carries the platen may be rocked rearwardly about the axis 28 to move the platen away from the printing type bars 718, shown in Fig. 4.

A record sheet R is fed under the platen from the rear (Fig. 4), passed around the same, and held in position by flexible fastening strips 29 of which one is shown in Fig. 4. The record strip is held in feeding relation to the platen by feed rolls 29$^a$. A work sheet W may be fed downward in front of the platen over a guide 29$^b$ when said platen is away from printing position, said sheet being positioned by collating stops 29$^c$. After the work sheet is positioned, the platen can be moved back to printing position in which event the work sheet is automatically engaged by rolls 29$^d$ which hold it in feeding relation to the platen.

The present invention concerns improvements in the mechanism for automatically moving the platen away from the printing position after the desired work has been done on a work sheet in order that said sheet may be easily and quickly removed and another inserted.

Automatic release of work sheets

The general construction of the mechanism for automatically moving the platen will be most easily understood by referring to Fig. 7. A cross bar 30 on the transversely movable paper carriage supports an inclined cam shaped member 31 which may be fixed at different positions on the bar by means of the adjustable connecting devices 32. This cam cooperates with a roller 33 which is shown in operative position in Fig. 7. As the carriage moves to the right as viewed in Fig. 7, the upper side of the cam engages under the roller and the cam is forced downwardly to the dot and dash position of Fig. 7, which results in tilting the platen carrying frame rearwardly about its axis. In this general manner the platen is automatically moved when the carriage reaches a predetermined columnar position, the details of the mechanism being as follows.

Fixed to the stationary plate 34 at the rear of the machine is a plate 35 provided with an arcuate slot 36. The roller 33 is carried on the end of an arm 37, pivoted at 38 to the plate 35. This arm is normally urged in a clockwise direction by a spring 39. The construction and mounting of the parts is illustrated in detail in Fig. 13 where it will be observed that the roller 33 rotates on a stud 40 extending through the arm 37 and into a nut 41 which travels in the arcuate slot 36 (Fig. 7). This slot limits the clockwise movement of the roller 33, but the latter is free to move counterclockwise from its normal position against the tension of the spring 39. For example, referring to Fig. 7, if the cam 31 has moved to the right of the roller in this figure and the carriage is then moved to the left, the under side of the cam will strike the top of the roller and move the roller and its arm 37 counterclockwise against the tension of the spring 39 which operation will have no effect on the platen carrying frame. The cam 31 is simply allowed to pass by the roller on the return movement of the carriage.

By reference to Fig. 8, it will be noted that, if the roller 33 is held in the position there shown, it will be out of the path of the cam 31, so that, when the cam passes over the position of the roller, the latter will not act on the cam and will not automatically tilt the platen frame. Provision is made for locking the roller in this inoperative position, such provision including a three-armed lever 50 pivoted at 51 and urged in a counterclockwise direction by a spring 52. The lateral arm 53 of this lever has a shoulder 54 which, under certain conditions, is positioned in the path of a stud 55 carried by an arm 56 fixed to the hub 38 of the swinging arm 37 as illustrated in Fig. 13. When this shoulder is behind the stud 55 as illustrated in Fig. 8, the roller 33 is held downwardly out of the path of the cam 31 and the automatic tilting feature of the carriage is rendered inoperative.

The three-armed lever 50 for holding the cam roller 33 in inoperative position may be disabled for this purpose by means of a cam plate 60 pivoted at 61 to a reciprocating plate 62, and movable by hand from its Fig. 8 to its Fig. 7 position and vice versa. The lower end of this cam plate operates against a stud 63 on the downwardly projecting arm of the three-armed lever 50. The cam plate 60 has a protuberance 64 struck from it (Fig. 13) which is adapted to seat in either one of two holes 65 in the sliding plate 62 where it is releasably held in either of its two positions by a spring mounted on stud 61. Assuming that the sliding plate 62 occupies its uppermost position as illustrated in Figs. 7 and 8, it will be clear that when the cam plate 60 occupies the position illustrated in Fig. 8, the three-armed lever 50 is free to move to its latching position because the cam plate 60 does not interfere with movement of the stud 63, but when the cam plate is moved clockwise to the position of Fig. 7, the three-arm lever 50 is cammed clockwise by the engagement of the end of the cam plate 60 with the stud 63 and the lateral arm 53 of said lever is thus moved clockwise to move its shoulder 54 out of the path of stud 55, thereby releasing the swinging arm 37. In other words, the latch for the arm 37 with its roller 33 is disabled under certain conditions by means of the cam plate 60.

When the portion of the carriage carrying the platen is tilted rearwardly, it is latched in this position by means of a latch 165 provided with a slot having an enlarged end 66 which engages over a stud 67 on the carriage (Fig. 9). The upper end of this latch is connected to a cross bail 68 which extends across the carriage to be in convenient position to be depressed by an operator. Depression of the bail raises the latch 165 and permits the platen frame to automatically return to normal which it does under the influence of a spring.

Control of tilting by "throwback" key

It is sometimes desirable to enter two or more lines of items before automatically throwing the platen back from the printing line. In such event, the automatic tilting feature is rendered inoperative by placing the cam plate 60 in the position illustrated in Fig. 8 and provision is then made for enabling the throwback feature by means of a key on the keyboard.

A "throwback" key 70 is mounted on the keyboard in position to overlap the motor starting or touch bar 25 so that, when the throwback key is depressed, the touch bar will also be operated. The key 70 is mounted on an irregular shaped stem or bar 71 slidably mounted on a stud 72 projecting from the frame of the machine as illustrated in detail in Fig. 10, and urged toward its raised normal position by a spring 71ª. The lower end of the stem 71 is connected to a bell crank lever 73 pivoted on the frame of the machine and carrying a stud 74 engaging the end of an arm 75 fixed to the shaft 76. The shaft 76 has an arm 77 fixed to it which is connected to a link 78 that, in turn, is connected to the sliding member 62. When the throwback key 70 is depressed, this train of connections will act to draw the member 62 downwardly and, since the throwback key overlaps the touch bar 25, the touch bar will also be depressed and the machine given a stroke of operation. Downward movement of slide 62 causes cam 60 to trip latch 50 which releases the arm 37 for movement to operative position. Operation of the machine tabulates the carriage one step and, since the throwback key would ordinarily not be used except at the end of a line of entries, this tabulation is such as to cause cam 31 to engage roller 33 to automatically throw the platen frame rearward.

As an example of the use of this special throwback key, assume that the operator desires to enter two or three lines of items and then have the carriage tilted back. When work of this kind is to be done, the cam plate 60 occupies the position of Fig. 8 which means that the roller 33 is normally held lowered out of operative position and the carriage is not tilted during its movement back and forth across the machine. It is not necessary to depress the roller 33 because the starting position is with the roller just to the left of the cam plate and as the carriage moves first to the right and back to the left the roller 33 will be latched down as it passes beneath the cam 31. After the operator has entered the desired number of lines, if he wishes to have the platen tilted back, it is merely necessary to depress the throwback key 70 instead of the touch bar. Depression of this key pulls the slide 62 downwardly and causes the cam 60 to force the three-armed lever or latch 50 out of latching position to thereby permit the roller 33 to move up to active position. Depression of the throwback key also results in depression of the touchbar which causes an operation of the machine and, since the operator would not ordinarily want the platen tilted back except at the end of a line, the result is that the operation of the machine causes a tabulation of the carriage with the cam 31 in proper position to cause the platen frame to be tilted back to its rearward position for the removal of old work sheets and insertion of new ones.

Control of tilting by total key

It is sometimes desirable to enter two or more lines of items and then have the platen frame tilt automatically rearward immediately after taking a total. In order that this may occur without the necessity of depressing a special throwback key, connections have been provided for controlling the tilting mechanism through depression of the total key and the touch bar 25 in the taking of a total.

The total key "T" (Fig. 12) is connected to a bell crank lever 80, which, in turn, is connected to a link 81 having a downwardly extending projection 82 carrying a stud 83. This stud is adapted to contact the end of an arm 84 of a three-armed lever whose downwardly extending arm 85 contacts a stud 86 on a lever 87 fixed to the shaft 76 which carries the arm 77 for drawing the slide 62 downward. The arm 87 is normally urged clockwise by spring 88, illustrated in Fig. 12. The three-arm lever is prevented from overthrow counter-clockwise by a spring 89.

When the total key is depressed from the position of Fig. 4 to that of Fig. 12 and the touchbar operated, the link 81 is thrust rearwardly and the stud 83 cams the arm 84 downwardly which causes the arm 85 to rock 87 against the tension of the spring 88 and rock the shaft 76 counterclockwise. This draws the slide 62 downwardly through the medium of the arm 77 and the link 78 with the result the cam plate 60 cams the latch 50 out of latching position to permit the roller 33 to move to active position. Accordingly, when the carriage tabulates after the total is printed, the roller 33 moves the cam 31 and automatically tilts the platen frame rearwardly to permit the papers to be withdrawn.

Sub-totaling operation

It is usually not desired to remove the papers from the carriage when a sub-total is taken but depression of the sub-total key operates the same link 81 as does depression of the total key and it is therefore necessary to provide connections for preventing depression of the sub-total key from causing the platen frame to be automatically tilted.

The sub-total key is connected to a bell crank lever 90 which, in turn, is connected to the link 91 having a projection engaging a stud 92 on the bell crank lever 80. The link 91 also has a stud 93 which is straddled by the bifurcated end of one arm of a bell crank lever 94. The other arm of this lever has a cam shaped end 95 engaging a stud 96 on the third arm 97 of the three-armed lever previously mentioned.

When the sub-total key is depressed, the bell crank 94 is rocked counter-clockwise and the timing is such that this lever is rocked prior to the time that the link 81 is moved rearwardly to cause the stud 83 to engage the cam shaped end of the arm 84. The counter-clockwise movement of the bell crank lever 94 causes the cam end 95 to engage the stud 96 and rock the arm 84 upwardly against the tension of the spring 89 so that, when the stud 83 moves rearwardly, it will pass under the end of arm 84 as shown in Fig. 14. Accordingly, the arm 84 is not rocked clockwise and the shaft 76 is not moved because the slight counter-clockwise movement of the arm 84 does not effect the arm 87 as the arm 85 is free to move to the right out of engagement with the stud 86.

Interlock between throw-back key and touch bar

In order to prevent the throwback key 70 from being depressed when the touch bar 25 has been depressed and vice versa the following mechanism is provided:

A hook-shaped member 100 (Figs. 1 and 10) is mounted between the head of the stud 72 and the bar 71. The upper hook-shaped end of this member engages over a stationary stud 101 to prevent hook-shaped member 100 from turning on 72 and its lower end has a side face 102 which serves, under certain conditions, as an abutment for one arm of a bell crank lever 103 whose other arm has a bifurcated end straddling a stud on the pivoted member 24 which is moved downwardly when the touch bar is depressed.

The normal position of the parts is shown in Fig. 1, where it will be observed that the bell crank lever 103 is positioned so that it will clear the top of the abutment 102 when the touch bar is depressed. When the touch bar is depressed, the lower arm of this bell crank lever moves over the edge 105 of the member 100, and since the bell crank lever is carried by the bar 71 to which the throwback key 70 is attached, it follows that the throwback key cannot be depressed if the touch bar has been operated.

This same construction also prevents independent depression of the touch bar after the throwback key has started down. When the throwback key is depressed even slightly, the bell crank lever 103 moves down to the position of Figure 10 where the abutment face 102 of the member 100 prevents the bell crank lever from being rocked. It is accordingly impossible to depress the touch bar independently, but the touch bar can move downward with the throwback key because, as the throwback key is moved downwardly, the bell crank lever 103 moves down and carries the member 24 with it so that the parts 103 and 71 move together. The downward movement of the bell crank lever 103 and the arm 24 permits free downward movement of the touch bar.

Interlock between carriage and motor touch bar

In order to prevent operation of the machine while the platen frame is tilted to its rearward position, a locking means has been provided for preventing depression of the touch bar.

The cross bail 68 of the latch 165 (Fig. 1) which holds the platen frame in its rearward position contacts an arm 110 of a yoke shaped member 111, shown in Fig. 5, which has a second arm 112 carrying a stud 113 (Fig. 9) which engages one arm of an angle lever 114 that is normally urged in a clockwise direction by a spring 115. This angular lever or latch 114 has an abutment portion 116 adapted to engage a stud 117 on the bell crank lever 103 carried by the throwback key stem 71.

When the parts are in their normal position shown in Fig. 1, this abutment 116 is sufficiently out of the path of the stud 117 to permit the bell crank lever 103 to be rocked during depression of the starting bar.

If, however, the platen frame is tilted rearwardly, the latch 65 with its bail 68 is rocked counterclockwise sufficiently to cause the bail 68 to contact the arm 110 and rock the yoke 111 in a clockwise direction to move the latch 114 counterclockwise to position the abutment 116 in the path of the stud 117. This prevents the bell crank lever 103 from being rocked and thus prevents depression of the touch bar while the platen frame is tilted rearwardly.

Starter bar lock to prevent operation when carriage is between columns

The machine is equipped with the usual tabulator bar carrying tabulating dogs one of which 120 is illustrated in Fig. 5. The carriage is stopped in a columnar position by the contact of one of the dogs 120 with a stop 121 (Fig. 2) carried on a stud 122 extending through a slot in the back plate 123 and connected to a link 124. This link 124 is connected to an arm 125 (Fig. 5) whose other end is connected to the piston 126 of a dash pot carried on a bracket 127 of the machine. When the dog 120 strikes the stop the link 124 is moved to the right as viewed in Fig. 5, and the dash pot cushions the stopping of the carriage.

The lower end of the arm 125 carries a stud 128 operating in the slot of a link 129 connected to one end of a bell crank lever 130 whose other arm bears against and above an arm of a bell crank lever 131 which is normally urged in a counterclockwise direction by the spring 132—shown in Fig. 5. The bell crank lever 131 is connected to a link 133 whose other end is connected to a pivoted locking arm 134 having an offset lug 135 adapted to be positioned in the path of a shoulder 136 on the bar 22 which is moved upwardly in starting the motor.

It will be apparent that whenever one of the tabulating dogs 120 is in contact with the stop 121 so that the link 124 is drawn to the right, the link 129 will also be drawn to the right, the bell crank lever 130 rocked counter-clockwise, the bell crank lever 131 rocked clockwise, and the link 133 thrust to the left to move the offset lug 135 out of the path of the shoulder 136. Whenever one of the tabulating dogs is not in contact with the stop 121, the spring 137 connected to the arm 125 immediately draws this arm to the left, as viewed in Fig. 5. This frees the link 129 for movement to the left and the spring 132 acts to rock the bell crank lever 131 counterclockwise, thereby swinging the offset lug 135 into the path of the shoulder 136. In other words, whenever one of the tabulating dogs is not in contact with the stop 121 in its right hand position, the bar 22 is latched against movement. This prevents operation of the motor starting bar when the carriage is not in one of its columnar positions.

*Printing of totals below lines of items*

It is usually not desired to print the total on the same printing line as the items. In entering items, the carriage tabulates for each item entered and the mechanism is therefore normally in condition for tabulating. In taking of a total the machine is first given a spacing stroke and a tabulating action would result from this stroke unless some means were provided to prevent it. If it is desired to print the total immediately below the last line of items and at the right hand side of the paper, the tabulating mechanism must be disabled and the line spacing mechanism enabled so that the carriage will not be tabulated but the platen will be moved up one line space to permit the total to be printed in the proper place.

This operation is controlled by a posting key 140 which overlies the motor starting bar 25 as shown in Fig. 1. This key has an irregular shaped slidably mounted stem 141 carrying a stud 142 adapted to contact one end of a lever 143 whose other end is connected to a second lever 144. The rear end of the lever 144 bears against a stud 145 carried by the arm 146 pivoted to the full stroke sector 147 which is standard on Burroughs machine.

When the posting key 140 is depressed the stud 145 is moved downwardly into the vertical portion of a slot 148 in a pendant piece 149 pivoted at 155 on the frame of the machine. A spring 150 connected to the link 146 and the pendant 149 holds these two parts in a normal Fig. 1 position. The pendant 149 has a notched portion 151 on its under side which engages over the stud 152 on a three-armed lever 153 which is slidably mounted on a stud 154. The upper arm of this lever is slidably mounted and guided by the stud 155.

When the posting key is depressed, the stud 145 is moved into the vertical slot 148. Operation of the machine then causes the link 146 to pull the pendant 149 to the left. The cam portion 151 then acts on the stud 152 to move the three-armed lever 153 downward and the rear end of this lever acts to disable the tabulating mechanism and enable the line spacing mechanism, both of said mechanisms being well known and therefore not illustrated and described in detail herein, reference being made to Vincent-Benner No. 924,118, Benner No. 1,046,546, and Rinsche No. 1,580,534. The result is that the carriage is not tabulated laterally but the platen is line spaced. The total key may then be depressed and the machine operated, which will result in printing the total and cause the platen to be automatically thrown back to permit the papers to be removed.

It is to be understood that the structure shown is for purposes of illustration only and that variations may be made in it without departing from the spirit and scope of the invention as defined by the appended claims.

I claim:

1. The combination in a calculating machine of a paper carriage movable laterally to different columnar positions and including a portion movable to a position to permit ready removal and insertion of papers, means for automatically moving said portion as the carriage moves to a predetermined columnar position, settable means for disabling said automatic means, and manipulative means whereby an operator may cause said carriage portion to be automatically moved while the settable means is set to disable the automatic means.

2. The combination in a calculating machine having a keyboard and calculating devices, of a paper carriage movable laterally to different columnar positions and including a portion movable to a position to permit ready removal and insertion of papers, means for automatically moving said portion as the carriage moves to a predetermined columnar position, settable means for holding said automatic moving means in disabled condition, and means including a manipulative member on the keyboard for enabling said automatic means while the settable means remains set for disabling said automatic means.

3. In combination, in a calculating machine, a laterally movable paper carriage having a work sheet holding means movable to a position to permit ready removal and insertion of work sheets, mechanism for moving said work sheet holding means, a member settable to a position to disable said mechanism, and a manipulative member having connections for moving said settable member to enable the mechanism while said settable member remains set for disabling said mechanism.

4. The combination in a calculating machine of a paper carriage movable laterally to different columnar positions and including a portion movable to a position to permit ready removal and insertion of papers, means for automatically moving said portion as the carriage moves to a predetermined columnar position, means for holding said automatic means in disabled condition, and manipulative means for temporarily enabling said automatic means to enable a movement of the carriage portion to take place at the will of the operator while the holding means is in condition to disable said automatic means.

5. The combination in a calculating machine of a paper carriage movable laterally to different columnar positions and including a portion movable to a position to permit ready removal and insertion of papers, means for automatically moving said portion as the carriage moves to a predetermined columnar position, a latch for holding said automatic means in disabled condition, and means for temporarily releasing said latch to enable said automatic means without permanently releasing the latch.

6. In combination, in a calculating machine having a keyboard, a laterally movable paper carriage having a work sheet holding means movable to a position to permit ready removal and insertion of work sheets, mechanism controlled by operation of the machine for moving said work sheet holding means to said position, a latch for holding said mechanism in disabled condition, and a manipulative member on the keyboard having connections for releasing said latch.

7. In combination, in a calculating machine, a laterally movable paper carriage having a work sheet holding means movable to a position to permit ready removal and insertion of work sheets, a normally disabled mechanism for moving said work sheet holding means to said position, and a key and connections for conditioning said mechanism at the will of the operator prior to operation of the machine to cause the mechanism to automatically move the work sheet holding means to said position during operation of the machine.

8. In combination, in a calculating machine having a printing mechanism, a laterally movable paper carriage having a platen movable into and out of printing position relative to said printing mechanism, a normally disabled mechanism for moving said platen out of printing position, and a key and connections for conditioning said mechanism at the will of the operator to cause it to automatically move said platen out of printing position during operation of the machine.

9. In combination, in a calculating machine having a printing mechanism, a laterally movable paper carriage having a platen movable into and out of printing position relative to said printing mechanism, mechanism for automatically moving said platen out of printing position, a latch for holding said mechanism in disabled condition, and a key and connections for releasing said latch.

10. In combination, in a calculating machine, a laterally movable paper carriage having a work sheet holding means movable to a position to permit ready removal and insertion of work sheets, mechanism actuated by tabulating movements of said carriage for moving said work sheet holding means to said position, and a manipulative member on the calculating machine keyboard having connections for conditioning said mechanism prior to operation of the machine to cause the tabulation of the carriage during operation of the machine to automatically move said work sheet holding means to said position.

11. In combination, in a calculating machine, a laterally movable paper carriage having a platen movable to and from printing position, a guide for guiding a work sheet under said platen from the front while said platen is out of printing position, feed rolls for automatically holding said work sheet against said platen as the platen is moved to printing position, a normally disabled mechanism controlled by operation of the machine for moving said platen out of printing position and out of engagement with said feed rolls, and a key and connections for conditioning said mechanism at the will of the operator prior to operation of the machine to cause it to automatically move the platen out of printing position as the machine completes its operation to thereby permit ready removal of the work sheet.

12. In combination, in a calculating machine, a laterally movable paper carriage having a platen movable to and from printing position, a guide for guiding a work sheet under said platen from the front while said platen is out of printing position, feed rolls for automatically engaging said work sheet to hold it against the platen as said platen is moved to printing position, a normally disabled mechanism adapted to be operated by the carriage as it moves to a predetermined columnar position for moving said platen out of printing position and out of engagement with said feed rolls, and a key and connections for conditioning said mechanism at the will of the operator prior to operation of the machine to cause said mechanism to be automatically operated by said carriage as it moves laterally to said predetermined column at the end of the operation of the machine.

13. In combination, in a calculating machine having a totaling means, a laterally movable paper carriage having a work sheet holding means movable to a position to permit ready removal and insertion of work sheets, a normally disabled mechanism for moving said work sheet holding means to said position, and connections operated by said totaling means when the latter is moved to condition the machine to take a total for conditioning said mechanism to cause operation of the machine to automatically move said work sheet holding means to said position after a total has been taken.

14. The combination in a calculating machine of a paper carriage movable laterally to different columnar positions and including a portion movable to a position to permit ready removal and insertion of papers, means for automatically moving said portion as the carriage moves to a predetermined columnar position, settable means for holding said automatic means in disabled condition, and a total key having connections for enabling said automatic means while said settable means is set to disable said automatic means.

15. The combination in a calculating machine having a totaling mechanism settable by both a total and a sub-total key, of a paper carriage movable laterally to different columnar positions and including a portion movable to a position to permit ready removal and insertion of papers, means for automatically moving said portion as the carriage moves to a predetermined columnar position, means for holding the automatic means in disabled condition, means operable by said totaling mechanism when said mechanism is operated by said total key for enabling said automatic means, and connections operable by the subtotal key for preventing operation of the totaling mechanism by the subtotal key from enabling said automatic means.

16. In combination, in a calculating machine, a laterally movable paper carriage having a work sheet holding means movable to a position to permit ready removal and insertion of work sheets, mechanism for moving said work sheet holding means to said position, means for returning the carriage across the machine after it has been tabulated to a given position in one direction, said carriage having provisions for moving said mechanism to disabled condition as the carriage is returned across the machine, a latch for holding said mechanism in said disabled condition, and a manipulative member having connections for releasing said latch at the will of the operator.

17. The combination in a calculating machine of a paper carriage movable laterally to different columnar positions and including a portion movable to a position to permit ready removal and insertion of papers, means for automatically moving said portion as the carriage moves to a predetermined columnar position, a latch for holding said automatic means in disabled condition, and a control key having connections for temporarily disabling the latch, said automatic means being positioned so that, as the carriage is returned after having tabulated to the limit of its movement, the automatic means is reset to disabled condition.

18. In combination, in a calculating machine, a laterally movable paper carriage having a work sheet holding means movable to a position to permit ready removal and insertion of work sheets, mechanism for automatically moving said work sheet holding means to said position, means for returning the carriage across the machine, said carriage having provisions for moving said mechanism to disabled condition as the carriage is returned, a latch normally acting to hold said mechanism in disabled condition when the latter is moved to said condition by said carriage, and means for disabling said latch to prevent it from holding said mechanism in disabled condition when the latter is moved to said condition by the carriage.

19. The combination in a calculating machine of a paper carriage movable laterally to different columnar positions and including a portion movable to a position to permit ready removal and insertion of papers, means for automatically moving said portion as the carriage moves to a predetermined columnar position, a latch for holding said automatic means in disabled condition, a cam member settable to positions to disable and enable said latch, said cam member being mounted on a movable member and manipulative means for moving said cam carrying member to temporarily disable said latch when the cam member is set to enable said latch.

20. The combination in a calculating machine of a paper carriage movable laterally to different columnar positions and including a portion movable to a position to permit ready removal and insertion of papers, means for automatically moving said portion as the carriage moves to a predetermined columnar position, a latch for holding said automatic means in disabled condition, a cam member settable to positions to enable and to disable said latch, said cam being mounted on a movable member, and a control key for moving said cam carrying member, said cam being mounted on said movable member so that when the member is moved the cam acts to disable the latch although said cam is set to normally enable the latch.

21. In a calculating machine having a printing mechanism, a laterally moving paper carriage, a platen carrying frame pivoted to said carriage, means for automatically swinging said platen frame on its pivots as the paper carriage moves to a predetermined columnar position, a latch for normally latching said automatic means in disabled condition after it has moved said platen frame, and a key and connections for releasing said latch at will.

22. In combination, in a calculating machine, a laterally moving paper carriage, a platen carrying frame pivoted to said carriage, a cam on said frame, means for engaging said cam as the paper carriage moves in one direction to cause the platen frame to be swung on its pivots, said means being engaged by said cam as the carriage is moved in a reverse direction whereby said means is moved to disabled condition, a latch for normally holding said means in disabled condition when moved to such condition by said cam, and a key and connection for releasing said latch at will.

23. In combination, in a calculating machine, a traveling paper carriage, a platen carrying frame pivoted to said carriage, an inclined double faced cam on said carriage, a roller adapted to engage one face of said cam as the carriage moves in one direction to swing the platen frame on its pivots, the other side of said cam engaging said roller as the carriage moves in the opposite direction to move said roller to an inactive position, a latch for normally holding said roller in the position to which it is moved by said cam, and a key and connection for releasing said latch at will.

In testimony whereof, I have subscribed my name.

ROBERT L. MULLER.